US010919583B2

(12) United States Patent
Elogab et al.

(10) Patent No.: US 10,919,583 B2
(45) Date of Patent: Feb. 16, 2021

(54) ACTIVE DRAG-REDUCTION SYSTEM AND A METHOD OF REDUCING DRAG EXPERIENCED BY A VEHICLE

(71) Applicant: OGAB Ltd., Somerset (GB)

(72) Inventors: Osama Elogab, Somerset (GB); Hatem Elogab, Somerset (GB)

(73) Assignee: Ogab Ltd., Somerset (GB)

( * ) Notice: Subject to any disclaimer, the term of this patent is extended or adjusted under 35 U.S.C. 154(b) by 84 days.

(21) Appl. No.: 16/293,619

(22) Filed: Mar. 5, 2019

(65) Prior Publication Data
US 2019/0202505 A1 Jul. 4, 2019

Related U.S. Application Data

(63) Continuation of application No. PCT/GB2016/052729, filed on Sep. 5, 2016.

(51) Int. Cl.
*B60J 9/00* (2006.01)
*B62D 37/02* (2006.01)
(Continued)

(52) U.S. Cl.
CPC .............. *B62D 37/02* (2013.01); *F15D 1/008* (2013.01); *F15D 1/12* (2013.01)

(58) Field of Classification Search
CPC ........ C01P 2002/85; C07C 47/22; F21K 9/64; H01L 33/502; B01J 2523/00;
(Continued)

(56) References Cited

U.S. PATENT DOCUMENTS 1,871,396 A * 8/1932 Stalker ................. B62D 35/007
296/180.1
1,923,349 A * 8/1933 Wolverton ............. A45D 44/12
296/180.1
(Continued)

FOREIGN PATENT DOCUMENTS

EP 1544089 6/2005

OTHER PUBLICATIONS

WIPO, International Search Report and Written Opinion in corresponding PCT application PCT/GB2016/052729, dated Jun. 7, 2017.

*Primary Examiner* — Kiran B Patel
(74) *Attorney, Agent, or Firm* — Ryan Alley IP (57) ABSTRACT

There is provided an active drag-reduction system having first 22 and second 24 fluid outlets located on a vehicle 10 adjacent to a low pressure (drag) region 12, wherein fluid ejected from the second fluid outlet 24 is at a higher pressure/ejection velocity than from the first fluid outlet 22. Turbulent and/or low pressure regions adjacent to vehicles are not uniform, but rather have a varying intensity. For instance, the centre of a region may have a lower pressure and/or more turbulent nature than the periphery of the region. The system may inject relatively higher pressure air (or relatively higher speed air) into the relatively lower pressure/more turbulent part of the low pressure/turbulent region, and relatively lower pressure air (or relatively lower speed air) into the relatively higher pressure/less turbulent part of the low pressure/turbulent region, compared to each other.

4 Claims, 5 Drawing Sheets

(51) Int. Cl.
  *F15D 1/00* (2006.01)
  *F15D 1/12* (2006.01)
(58) Field of Classification Search
  CPC .... C08F 210/00; C08F 210/06; C08F 210/16; C08L 67/02; A23V 2002/00
  See application file for complete search history.

(56) References Cited

U.S. PATENT DOCUMENTS

| | | | | |
|---|---|---|---|---|
| 2,037,942 | A * | 4/1936 | Stalker | B62D 35/00 180/89.1 |
| 3,910,623 | A * | 10/1975 | McKeen | B62D 35/001 296/91 |
| 4,170,381 | A * | 10/1979 | Helm | B60J 1/2008 296/91 |
| 4,320,919 | A * | 3/1982 | Butler | B62D 35/001 296/180.1 |
| 4,455,045 | A * | 6/1984 | Wheeler | B62D 35/00 105/1.2 |
| 4,702,509 | A * | 10/1987 | Elliott, Sr. | B62D 35/004 137/523 |
| 4,838,603 | A * | 6/1989 | Masoero | B60Q 1/0005 296/180.1 |
| 5,171,057 | A * | 12/1992 | Sharp | B60S 1/56 296/180.4 |
| 5,348,366 | A * | 9/1994 | Baker | B62D 35/001 296/180.4 |
| 5,375,903 | A * | 12/1994 | Lechner | B62D 35/001 296/180.1 |
| 5,407,245 | A * | 4/1995 | Geropp | B61D 17/02 296/180.1 |
| 5,688,020 | A * | 11/1997 | Burg | B62D 33/0273 296/180.1 |
| 5,908,217 | A | 6/1999 | Englar | |
| 6,068,328 | A * | 5/2000 | Gazdzinski | B62D 35/00 244/203 |
| 6,273,488 | B1 * | 8/2001 | Pike | B05D 5/083 296/91 |
| 6,286,894 | B1 * | 9/2001 | Kingham | B62D 35/001 105/1.1 |
| 6,297,486 | B1 * | 10/2001 | Rom | F42B 10/44 102/385 |
| 6,309,010 | B1 * | 10/2001 | Whitten | B62D 35/001 296/180.1 |
| 6,779,834 | B1 * | 8/2004 | Keller | B62D 35/001 296/180.4 |
| 7,192,077 | B1 * | 3/2007 | Hilleman | B62D 35/001 296/180.1 |
| 7,922,235 | B1 * | 4/2011 | Smith | B62D 35/001 296/180.2 |
| 8,079,634 | B2 * | 12/2011 | Visser | B62D 35/001 296/180.1 |
| 8,196,996 | B1 * | 6/2012 | Campbell | B62D 35/001 296/180.4 |
| 8,210,600 | B1 * | 7/2012 | Verhee | B62D 35/005 296/180.1 |
| 8,579,357 | B2 * | 11/2013 | Nusbaum | B62D 35/001 296/180.1 |
| 8,794,363 | B2 * | 8/2014 | Wolf | B60K 11/085 180/68.1 |
| 8,870,275 | B1 * | 10/2014 | Schmidt | B62D 35/001 244/209 |
| 9,199,674 | B2 * | 12/2015 | Wolf | B60K 11/08 |
| 9,266,571 | B2 * | 2/2016 | D'Arcy | B62D 35/005 |
| 9,371,097 | B1 * | 6/2016 | Conny | B62D 35/004 |
| 9,561,827 | B2 * | 2/2017 | Parry-Williams | B60K 11/085 |
| 9,738,330 | B2 * | 8/2017 | Wolf | F03D 9/32 |
| 9,776,674 | B2 * | 10/2017 | Baker | B62D 35/001 |
| 9,994,265 | B2 * | 6/2018 | D'Arcy | B62D 35/005 |
| 10,099,730 | B1 * | 10/2018 | Williams | B62D 35/007 |
| 10,384,729 | B2 * | 8/2019 | Grosse | B62D 37/02 |
| 10,589,798 | B2 * | 3/2020 | Seidel | B62D 35/001 |
| 2002/0021023 | A1 * | 2/2002 | Leban | B62D 35/001 296/180.1 |
| 2002/0030384 | A1 * | 3/2002 | Basford | B62D 35/001 296/180.1 |
| 2003/0038508 | A1 * | 2/2003 | Fairburn | B62D 35/001 296/208 |
| 2005/0040669 | A1 * | 2/2005 | Wood | B62D 35/007 296/180.1 |
| 2006/0001292 | A1 * | 1/2006 | Shahbazi | B62D 35/00 296/180.1 |
| 2007/0024087 | A1 * | 2/2007 | Skopic | B62D 35/001 296/180.4 |
| 2007/0046066 | A1 * | 3/2007 | Cosgrove | B62D 35/001 296/180.4 |
| 2007/0089531 | A1 * | 4/2007 | Wood | B62D 35/001 73/861.22 |
| 2007/0187990 | A1 * | 8/2007 | Shahbazi | B62D 37/02 296/180.1 |
| 2008/0093886 | A1 * | 4/2008 | Nusbaum | B62D 35/001 296/180.1 |
| 2008/0116716 | A1 * | 5/2008 | O'Grady | B62D 35/001 296/180.4 |
| 2008/0211260 | A1 * | 9/2008 | Hsia | B62D 35/00 296/180.1 |
| 2008/0309122 | A1 * | 12/2008 | Smith | B62D 35/001 296/180.1 |
| 2009/0026797 | A1 * | 1/2009 | Wood | B62D 35/001 296/180.1 |
| 2009/0179456 | A1 * | 7/2009 | Holubar | B62D 35/001 296/180.4 |
| 2009/0200834 | A1 * | 8/2009 | Vogel | B62D 35/001 296/180.3 |
| 2009/0212594 | A1 * | 8/2009 | Breidenbach | B62D 35/007 296/180.1 |
| 2009/0236872 | A1 * | 9/2009 | Wood | B62D 35/001 296/180.1 |
| 2009/0256385 | A1 * | 10/2009 | Salaverry | B62D 35/00 296/180.1 |
| 2009/0256386 | A1 * | 10/2009 | Wood | B62D 35/001 296/180.1 |
| 2009/0295189 | A1 * | 12/2009 | Distel | B62D 35/001 296/180.1 |
| 2010/0225143 | A1 * | 9/2010 | Skopic | B62D 35/001 296/180.2 |
| 2011/0115254 | A1 * | 5/2011 | Skopic | B62D 35/001 296/180.3 |
| 2011/0272963 | A1 * | 11/2011 | Henderon | B62D 35/001 296/180.4 |
| 2011/0272965 | A1 * | 11/2011 | Henderson | B62D 35/001 296/180.4 |
| 2013/0076063 | A1 * | 3/2013 | Ryan | B62D 35/001 296/180.1 |
| 2013/0076064 | A1 * | 3/2013 | Smith | B62D 35/001 296/180.1 |
| 2013/0076068 | A1 * | 3/2013 | Wayburn | B62D 35/001 296/180.4 |
| 2013/0106135 | A1 * | 5/2013 | Praskovsky | F15D 1/10 296/180.1 |
| 2013/0140103 | A1 * | 6/2013 | Smith | B62D 35/001 180/309 |
| 2013/0140849 | A1 * | 6/2013 | Smith | B62D 35/001 296/180.1 |
| 2013/0168999 | A1 * | 7/2013 | Hitchcock | B62D 35/00 296/180.1 |
| 2013/0306177 | A1 | 11/2013 | Bonutti | |
| 2014/0167447 | A1 * | 6/2014 | Meredith | B62D 35/001 296/180.4 |
| 2014/0339854 | A1 * | 11/2014 | Tuerk | B62D 35/001 296/180.4 |
| 2014/0367993 | A1 * | 12/2014 | Breidenbach | B62D 35/001 296/180.4 |
| 2015/0054302 | A1 | 2/2015 | Yamaguchi et al. | |
| 2015/0225025 | A1 * | 8/2015 | Habershon | B62D 35/001 296/180.1 |
| 2017/0008577 | A1 * | 1/2017 | Vasilescu | B62D 35/001 |
| 2017/0274941 | A1 * | 9/2017 | Kantharaju | B62D 35/001 |

(56) References Cited

U.S. PATENT DOCUMENTS

| | | | |
|---|---|---|---|
| 2018/0093715 A1* | 4/2018 | Miller | B62D 35/001 |
| 2019/0092401 A1* | 3/2019 | Prakash | B62D 35/001 |
| 2019/0176906 A1* | 6/2019 | Miller | B62D 35/007 |
| 2019/0283813 A1* | 9/2019 | Smith | B62D 35/001 |

* cited by examiner

[Fig. 1]

PRIOR ART

ACTIVE DRAG-REDUCTION SYSTEM AND A METHOD OF REDUCING DRAG EXPERIENCED BY A VEHICLE

This application claims priority under 35 U.S.C. § 120 to, and is a continuation of, co-pending International Application PCT/GB2016/052729, filed Sep. 5, 2016 and designating the US. This International Application is incorporated by reference herein in its entirety.

BACKGROUND

Field

The present invention relates generally to an active drag-reduction system for vehicles and a method of reducing drag experienced by vehicles moving at speed and finds particular, although not exclusive, utility when applied to aeroplanes, aerofoils (including those used in wind turbines), automobiles, cars, lorries, trains and motorbikes.

Drag (also referred to as fluid resistance) experienced by moving vehicles of various different types comprises three main components: skin friction encountered in laminar flow, which is approximately proportional to the velocity of the vehicle in question; form drag encountered in turbulent flow, which is approximately proportional to the square of the velocity of the vehicle; and vortex drag, for example wing-tip, trailing or lift-induced vortices, which are circular patterns of rotating air left behind a wing as it generates lift, in particular at the wing tips, but also at any point on the wing where the lift varies span-wise, at the edge of flap devices, or at other abrupt changes in wing planform.

SUMMARY

It is desirable to minimise all forms of trailing vortices from a moving vehicle, whether they are from turbulent form drag of a vehicle or from vortex drag, for instance by ensuring that the maximum proportion of the drag is due to skin friction. Turbulent flow around a vehicle occurs during flow separation, when a low pressure and/or turbulent vortex region is formed (for instance, behind the vehicle), characteristic of a high Reynolds number in which turbulent flow dominates over laminar flow. In some vehicles multiple smaller vortices may form around the vehicle; in other vehicles, relatively large vortices may be formed. Elimination of these through shaping of bodywork of vehicles is common practice to increase efficiency of the vehicle.

It is also desirable to minimise vortex drag in particular, as wingtip vortices on aircraft can persist for relatively long times (of the order of several minutes after the passage of an aircraft) which can cause danger to other aircraft, in particular around airfields where time must be left between subsequent take-offs and/or landings on a given runway for such vortices to dissipate.

According to a first aspect of the present invention, there is provided an active drag-reduction system for a vehicle in which at least one turbulent and/or low pressure region is formed adjacent to the vehicle when moving at a speed above a predetermined threshold speed, the active drag-reduction system configured to reduce the at least one turbulent and/or low pressure region when activated, the active drag-reduction system comprising: at least one first fluid outlet located on the vehicle adjacent to the at least one region; at least one second fluid outlet located on the vehicle adjacent to the at least one region and spaced from the at least one first fluid outlet, the second fluid outlet arranged to eject fluid substantially toward an interior of the at least one region; and a fluid supply system configured to: provide fluid at a first pressure and/or first ejection velocity to the at least one first fluid outlet; and provide fluid at a second pressure and/or second ejection velocity to the at least one second fluid outlet, wherein the second pressure and/or second ejection velocity is greater than the first pressure and/or first ejection velocity, respectively.

Turbulent and/or low pressure regions adjacent to vehicles are not uniform, but rather have a varying intensity. For instance, the centre of a region may have a lower pressure and/or more turbulent nature than the periphery of the region. In this way, therefore, the present invention allows the system of the present invention to inject relatively higher pressure air (or relatively higher speed air) into the relatively lower pressure/more turbulent part of the low pressure/turbulent region, and relatively lower pressure air (or relatively lower speed air) into the relatively higher pressure/less turbulent part of the low pressure/turbulent region, compared to each other.

The at least one first and second fluid outlets may be configured to encourage laminar flow adjacent to a surface of the vehicle on which they are located.

In particular, the fluid ejected into the at least one region may act to fill the low-pressure and/or turbulent region, and may also act to draw adjacent laminar flow toward it (e.g. in accordance to Bernoulli's principle).

The at least one first fluid outlet may be located on the vehicle adjacent to a perimeter of the at least one region.

The at least one first fluid outlet may be arranged to eject fluid substantially parallel to a periphery of (e.g. tangentially to) the at least one region. That is, the at least one fluid outlet may be arranged such that, prior to activation of the system, fluid ejected therefrom would be directed substantially parallel to the periphery of the at least one region; however, subsequent to activation of the system, the size and shape of the region may be modified such that fluid ejected therefrom may be directed in a direction substantially non-parallel to the periphery of the at least one region.

The at least one second fluid outlet is arranged to eject fluid substantially toward an interior of the at least one region. For instance, the at least one second fluid outlet may be located on an aircraft wing to direct relatively high pressure or fast air into the centre of a wing-tip vortex, and/or the at least one first fluid outlet may be located on an aircraft wing to direct relatively low pressure or slow air along the bounding surface of the wing-tip vortex.

Alternatively of additionally, a plurality of second fluid outlets may be located along a trailing edge of an aerofoil. Optionally, a plurality of first fluid outlets may be arranged substantially above and/or below the plurality of second fluid outlets.

The at least one first fluid outlet may comprise only one, two, three, four, five or more first fluid outlets. For instance, the first fluid outlets may be arranged in a row along an edge of the vehicle. Fluid ejected therefrom may be ejected at a speed sufficient to encourage the Coanda effect in fluid passing over that edge; that is, laminar flow may be encouraged around the edge.

The at least one second fluid outlet may comprise only one, two, three, four, five or more first fluid outlets. For instance, the second fluid outlets may be arranged in a row and/or an array spaced from the edge of the vehicle.

The system may further comprise at least one third fluid outlet located on the vehicle adjacent to the at least one region and spaced from the at least one first fluid outlet and the at least one second fluid outlet; and the fluid supply system may be configured to: provide fluid at a third pressure and/or third ejection velocity to the at least one third fluid outlet, wherein the third pressure and/or third ejection velocity is greater than the first pressure and/or first ejection velocity, and less than the second pressure and/or first ejection velocity, respectively. The system may further comprise at least one fourth, fifth, etc. fluid outlet similar, mutatis mutandis, to the at least one third fluid outlet.

The first pressure and/or first ejection velocity may be between 4% and 35% of the second pressure and/or second ejection velocity, in particular between 5% and 20%, more particularly between 6% and 10%, for instance approximately 6%, 7% or 8%.

Similarly, the third pressure and/or third ejection velocity may be between 8% and 40% of the second pressure and/or second ejection velocity, in particular between 10% and 35%, more particularly between 12% and 20%, for instance approximately 12%, 15% or 18%.

In one arrangement, a first row of first fluid outlets is provided immediately below a spoiler of a car, a second row of second fluid outlets is provided immediately above a rear bumper/fender of a car, and (optionally) a third row of third fluid outlets is provided between the first row and the second row (for instance approximately half-way between).

The system may be configured to supply relatively high temperature fluid to the at least one first and/or second fluid outlets. The relatively high temperature fluid may have a temperature of between 70 and 130 degrees centigrade, in particular between 90 and 120 degrees centigrade, more particularly approximately 110 degrees centigrade.

The system may be configured to supply relatively low temperature gas to the at least one second and/or first fluid outlets. The relatively low temperature gas may have a temperature of between −50 and 10 degrees centigrade, in particular between −40 and −10 degrees centigrade, more particularly approximately −30 degrees centigrade.

The relatively high and the relatively low temperatures referred to may be relative to one another, and/or relative to ambient temperature and/or approximately 20 to 30 degrees centigrade. That is, the system may be configured to supply fluid to the first fluid outlet(s) at a temperature substantially higher or lower than to the second fluid outlet(s).

The system may heat and/or cool gas to provide the relatively high and relatively low temperature gas by any conventional means, for instance, electrical heating, via heat form a coolant system of an engine within the vehicle, from a heat exchanger with for instance exhaust gases, from the heat of compression of gas, from cooling due to expansion of the gas, from a heat exchanger with ambient air, from a refrigeration system, from a liquid nitrogen storage system, or due to passage down a corrugated pipe/tube or due to passage down a pipe/tube having an uneven and/or non-smooth interior.

The system may comprise a vortex tube configured to split gas into a relatively high temperature stream and a relatively low temperature stream, and may be configured to convey the high temperature stream to the at least one first and/or second fluid outlets and the low temperature stream to the at least one second and/or first fluid outlets, respectively.

The vortex tube may be a Ranque-Hilsch vortex tube, for instance of any known configuration. In particular, the vortex tube may comprise a swirl chamber and/or a conical nozzle, as is well known in the art.

The system may comprise a pump (e.g. an air pump as described below) a compressor (e.g. an air compressor as described below) or any other system for providing fluid, gas and/or air to the region via the outlets, preferably in a compressed form compared to ambient; this will be referred to herein as 'compressed air', but is intended to cover all stated possibilities unless otherwise stated. A pump may provide fluid directly to an outlet, or may provide fluid to a vortex tube that may then provide a relatively hot gas stream to one outlet and a relative cold gas stream to another outlet. The pump may be in the form of a compressed air pump, or may be a compressor located at an engine inlet (for instance as is present in a turbo charger), where compressed air may be bled off before introduction into the engine.

In some arrangements, the system may be reversed such that relatively high temperature air is expelled into a high pressure region in front of the vehicle, which may be present due to ram forces. The injected relatively high temperature air may warm the high pressure region, encouraging it to expand and dissipate; in any event, however, the higher temperature air is less dense than the ambient air. The less dense air replaces the ambient air in the high pressure region, and due to the lower density drag is reduced. In particular, in some specific arrangements, outlets may be directed toward relatively high pressure regions adjacent to the vehicle. In effect, this system may act as a virtual and/or invisible air splitter, for example serving to increase the amount of downforce at the front of a car on to which it is applied. An incoming airstream may be brought to stagnation by the expelled air, causing an area of high pressure. Below, air is redirected away from the stagnation zone and is accelerated, causing a pressure to drop, thereby creating downforce.

A further optional alternative would be to configure the system to blow relatively cool air (compared to ambient) over the surface of an aerofoil, for example during take-off of an aircraft. The cooler air is denser than ambient air, and therefore the density of air is increased locally around the wing. Lift generated by an aerofoil is proportional to the density of the air in which it acts; therefore, in this manner, more lift can be generated. This may be of particular use in hot environments where take-off from a ground-level runway can be severely impacted by high temperatures. Such relatively cool air may be blown over the surface of the aerofoil by a plurality of holes in the surface of the aerofoil, in particular on the high pressure side of the aerofoil (e.g. beneath an aircraft wing, or above an aerofoil wing on a car). Similarly, relative warm air (compared to ambient and/or the relatively cool air) may be blown over the surface of the aerofoil, in particular on the low pressure side of the aerofoil (e.g. beneath an aircraft wing, or above an aerofoil wing on a car). These modifications may in particular be used in relation to wind turbine blades.

The fluid outlets may comprise at least one propelling nozzle. The propelling nozzle may be located at an exhaust and/or air outlet. The gas referred to may be air, atmospheric air, engine exhaust, other gases, or a combination thereof. The region may be behind the vehicle, located on a wing and/or aerofoil of a vehicle, behind the cabin of a lorry, or in any other low pressure region adjacent to the vehicle.

The propelling nozzle may comprise a convergent and/or a divergent propelling nozzle. The propelling nozzle may have a pressure ratio defined as the outlet pressure divided by the inlet pressure. In the case of a convergent nozzle, if the nozzle pressure ratio is above a critical value (typically between approximately 1.6:1 to 2:1, e.g. about 1.8:1), the nozzle will choke, resulting in some expansion to ambient pressure taking place downstream of the nozzle throat (i.e. the portion of the nozzle having the smallest cross-sectional flow area); that is, in the jet wake. In this way, the imbalance between the throat static pressure and ambient pressure generates some (pressure) thrust.

The propelling nozzle may be, for example, a convergent-divergent propelling nozzle, which may be a form of divergent propelling nozzle. In a convergent-divergent nozzle, expansion occurring downstream of the convergent nozzle section acts against the inside of the divergent nozzle portion.

The propelling nozzle may comprise an ejector nozzle. The propelling nozzle may comprise a divergent propelling nozzle. Alternatively or additionally, the propelling nozzle may comprise a convergent propelling nozzle, for instance such that the convergent propelling nozzle is configured to produce a relatively high velocity jet, for instance when compared to the velocity of gas introduced to the convergent propelling nozzle and/or the velocity of gas expelled from the divergent propelling nozzle.

The at least one first fluid outlet may be located adjacent to a boundary of the region. That is, the at least one first fluid outlet may be located to direct a jet of fluid into a boundary/boundary-layer of the region. The region may be a turbulent boundary layer, and the boundary of the region may be the extent of the boundary layer. The at least one first fluid outlet may be located such that the extent of the boundary layer is reduced.

A high velocity jet may eliminate the region boundary/vortex boundary/eddy line by inducing the gas therein to equalise speed with gas outside the region.

The divergent nozzle may be configured to produce a relatively high pressure jet, for instance when compared to the pressure of gas introduced to the nozzle and/or the pressure of gas expelled from the convergent propelling nozzle.

The at least one second fluid outlet may be spaced from a boundary of the region. That is, the at least one second fluid outlet may be located to direct a jet of gas into the region, for instance into a central part of the region, a part of the region spaced from a boundary/boundary-layer of the region.

A high pressure jet may act to remove the low pressure region by expanding into said region.

The propelling nozzle may accelerate the available gas to subsonic, sonic, or supersonic velocities. The internal shape may be convergent or convergent-divergent. The propelling nozzle may have a fixed geometry, or they may have variable (i.e. controllable) geometry to give different exit areas to control the characteristics of the propelling jet. The propelling nozzle may be an ejector nozzle; however, other nozzle configurations are contemplated.

The propelling nozzle may be a supersonic ejector, for instance a conical nozzle; however, a tip ring nozzle, or an elliptic sharp tipped shallow (ESTS) lobed nozzle, as described in "Novel supersonic nozzles for mixing enhancement in supersonic ejectors", Srisha M. V. Raoa & G. Jagadeesh, Applied Thermal Engineering, Volume 71, Issue 1, 5 Oct. 2014, Pages 62-71, the contents of which is incorporated by reference herein in its entirety. Such preferred arrangements provide enhance mixing over that evident from a conical nozzle, for example a 30% increase in entrainment of secondary flow, and also provide a reduction in compression ratio of between 15% and 50%. In a conventional cone-shaped nozzle, the jet is ejected with massive momentum, carrying huge energy and creating noise. However, in the preferred nozzle configurations, the jet is spread and assimilated into the cold atmosphere more quickly, making the jet quieter and improving the 'push' provided by the propelling nozzle. Potentially, this could lead to a reduction in sound of between 25% and 35%.

The tip ring nozzle may comprise a divergent nozzle having a circular ring protruding at the exit of a conical nozzle. In particular, the tip ring nozzle may comprise a convergent-divergent nozzle, at the internal periphery of the outlet of the divergent nozzle section there may be provided an annular protrusion extending into the flow, the protrusion having a form that may be substantially ring-like (e.g. donut-shape or toroidal), and extending into the flow from the interior of the divergent nozzle section by approximately 5% of the radius of the divergent nozzle section outlet (e.g. between 2% and 10%, in particular between 4% and 8%, for instance 5 to 7%.

The elliptic sharp tipped shallow (ESTS) lobed nozzle may have elliptic lobes with relatively sharp tips (e.g. forming a cusp between the lobes), the tips protruding only a relatively short distance into the flow). In particular, they may project between approximately 5% and 20% of the radius of the nozzle outlet, more particularly between approximately 7% and 15%, for example 10%. The ESTS lobed nozzle may comprise a conventional lobed nozzle modified to have lobes with an elliptical cross-section projecting radially outward, and with cusps defining the join between adjacent elliptical regions, the cusps projecting inwardly from the interior wall of the divergent nozzle section by between approximately 5% and 20% the radius. In some arrangements, substantially the entire divergent nozzle section has such a cross-sectional form. In preferred embodiments, the nozzle may comprise four lobes; however, three, five, six or more lobes are also envisaged. The ESTS lobed nozzle may comprise a convergent-divergent nozzle.

The propelling nozzle may comprise aluminium alloy.

According to a second aspect of the invention, there is provided a method of reducing vehicular drag, the method comprising the steps of: providing a vehicle in which at least one turbulent and/or low pressure region is formed adjacent to the vehicle when moving at a speed above a predetermined threshold speed; providing an active drag-reduction system according to any preceding claim; and expelling fluid from the at least one first and second fluid outlets into the at least one region.

Alternators in motor vehicles are typically driven by the crankshaft, which converts the reciprocal motion of a piston into circular movement. Some early model vehicles used a separate drive belt from the crankshaft pulley to the alternator pulley, but most cars today have a serpentine belt, or one belt that drives all components that rely on crankshaft power. However, as more power is drawn from the crankshaft to operate such 'accessory components', the net or effective power output of the engine decreases for producing useful work such as for locomotion.

BRIEF DESCRIPTION OF THE DRAWINGS

The above and other characteristics, features and advantages of the present invention will become apparent from the following detailed description, taken in conjunction with the accompanying drawings, which illustrate, by way of example, the principles of the invention. This description is given for the sake of example only, without limiting the scope of the invention. The reference figures quoted below refer to the attached drawings.

DETAILED DESCRIPTION

The present invention will be described with respect to certain drawings but the invention is not limited thereto but only by the claims. The drawings described are only schematic and are non-limiting. Each drawing may not include all of the features of the invention and therefore should not necessarily be considered to be an embodiment of the invention. In the drawings, the size of some of the elements may be exaggerated and not drawn to scale for illustrative purposes. The dimensions and the relative dimensions do not correspond to actual reductions to practice of the invention.

Furthermore, the terms first, second, third and the like in the description and in the claims, are used for distinguishing between similar elements and not necessarily for describing a sequence, either temporally, spatially, in ranking or in any other manner. It is to be understood that the terms so used are interchangeable under appropriate circumstances and that operation is capable in other sequences than described or illustrated herein.

Moreover, the terms top, bottom, over, under and the like in the description and the claims are used for descriptive purposes and not necessarily for describing relative positions. It is to be understood that the terms so used are interchangeable under appropriate circumstances and that operation is capable in other orientations than described or illustrated herein.

It is to be noticed that the term "comprising", used in the claims, should not be interpreted as being restricted to the means listed thereafter; it does not exclude other elements or steps. It is thus to be interpreted as specifying the presence of the stated features, integers, steps or components as referred to, but does not preclude the presence or addition of one or more other features, integers, steps or components, or groups thereof. Thus, the scope of the expression "a device comprising means A and B" should not be limited to devices consisting only of components A and B. It means that with respect to the present invention, the only relevant components of the device are A and B.

Similarly, it is to be noticed that the term "connected", used in the description, should not be interpreted as being restricted to direct connections only. Thus, the scope of the expression "a device A connected to a device B" should not be limited to devices or systems wherein an output of device A is directly connected to an input of device B. It means that there exists a path between an output of A and an input of B which may be a path including other devices or means. "Connected" may mean that two or more elements are either in direct physical or electrical contact, or that two or more elements are not in direct contact with each other but yet still co-operate or interact with each other.

Reference throughout this specification to "an embodiment" or "an aspect" means that a particular feature, structure or characteristic described in connection with the embodiment or aspect is included in at least one embodiment or aspect of the present invention. Thus, appearances of the phrases "in one embodiment", "in an embodiment", or "in an aspect" in various places throughout this specification are not necessarily all referring to the same embodiment or aspect, but may refer to different embodiments or aspects. Furthermore, the particular features, structures or characteristics of any embodiment or aspect of the invention may be combined in any suitable manner, as would be apparent to one of ordinary skill in the art from this disclosure, in one or more embodiments or aspects.

Similarly, it should be appreciated that in the description various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Moreover, the description of any individual drawing or aspect should not necessarily be considered to be an embodiment of the invention. Rather, as the following claims reflect, inventive aspects lie in fewer than all features of a single foregoing disclosed embodiment. Thus, the claims following the detailed description are hereby expressly incorporated into this detailed description, with each claim standing on its own as a separate embodiment of this invention.

Furthermore, while some embodiments described herein include some features included in other embodiments, combinations of features of different embodiments are meant to be within the scope of the invention, and form yet further embodiments, as will be understood by those skilled in the art. For example, in the following claims, any of the claimed embodiments can be used in any combination.

In the description provided herein, numerous specific details are set forth. However, it is understood that embodiments of the invention may be practiced without these specific details. In other instances, well-known methods, structures and techniques have not been shown in detail in order not to obscure an understanding of this description.

In the discussion of the invention, unless stated to the contrary, the disclosure of alternative values for the upper or lower limit of the permitted range of a parameter, coupled with an indication that one of said values is more highly preferred than the other, is to be construed as an implied statement that each intermediate value of said parameter, lying between the more preferred and the less preferred of said alternatives, is itself preferred to said less preferred value and also to each value lying between said less preferred value and said intermediate value.

The use of the term "at least one" may mean only one in certain circumstances.

The principles of the invention will now be described by a detailed description of at least one drawing relating to exemplary features of the invention. It is clear that other arrangements can be configured according to the knowledge of persons skilled in the art without departing from the underlying concept or technical teaching of the invention, the invention being limited only by the terms of the appended claims.

Figure 1:
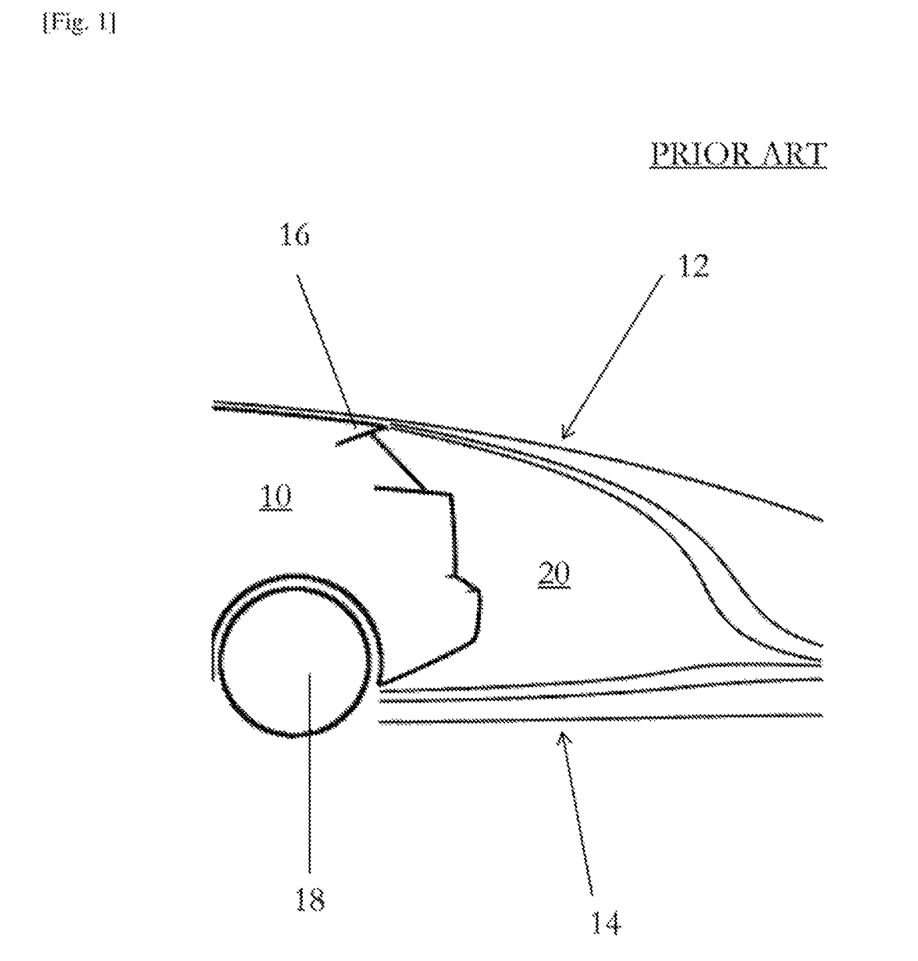
FIG. 1 is a schematic representation of airflow around the rear of a conventional automobile.

FIG. 1 is a schematic representation of airflow around the rear of a conventional automobile 10. Three upper stream-lines 12 are shown passing over the top of the vehicle, and three further lower stream-lines 14 are shown passing underneath the vehicle. Flow separation occurs for the upper streamlines 12 immediately behind the spoiler 16. Similarly, for the lower streamlines 14, flow separation occurs immediately behind the rear wheel 18. Accordingly, for the majority of the view shown, laminar flow is spaced substantially away from the vehicle. A relatively large low pressure/turbulent region 20 is shown immediately behind the vehicle and extending between one and two meters away from the rear of the vehicle.

Figure 2:
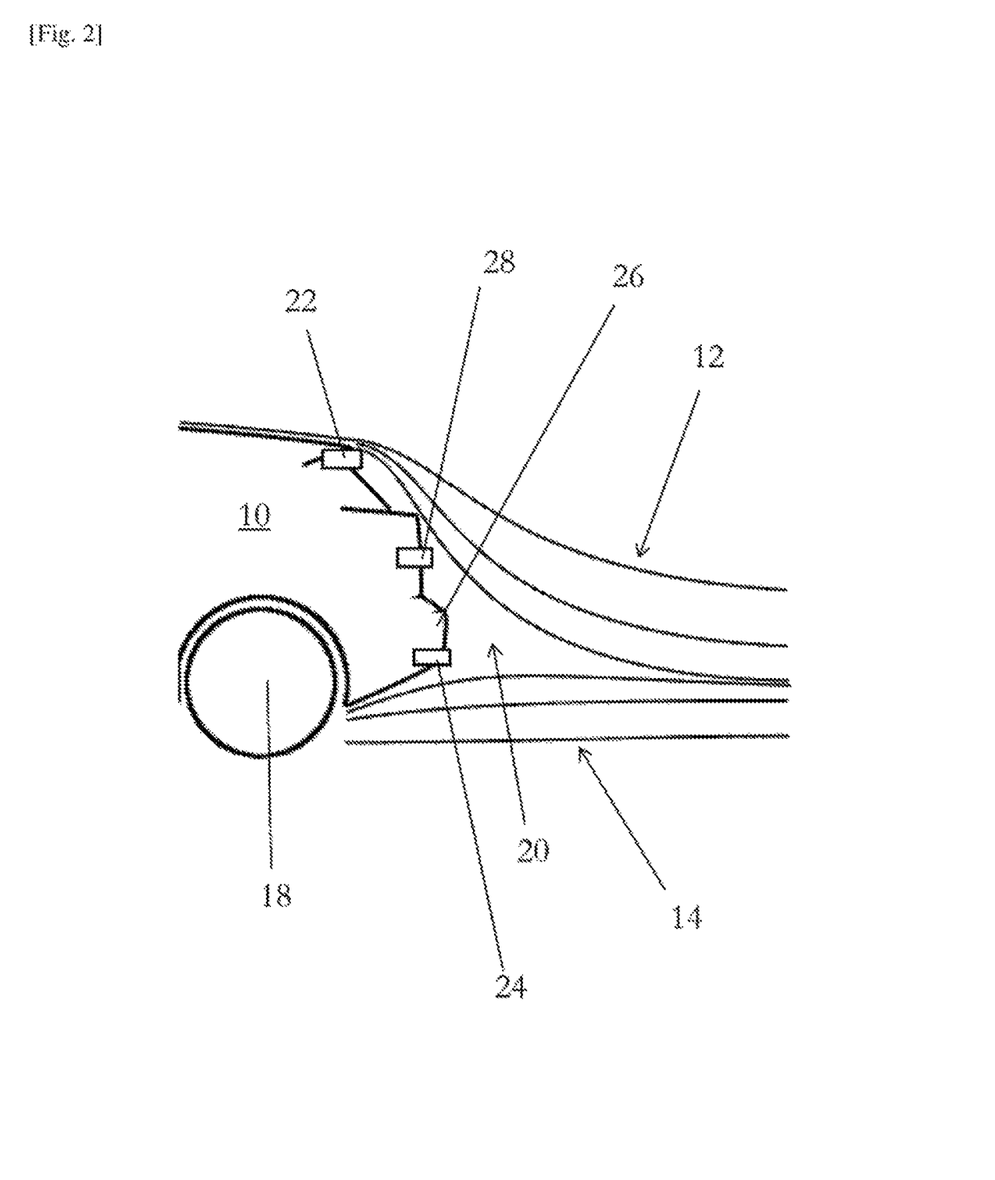
FIG. 2 is a schematic representation of airflow around the rear of the automobile of FIG. 1 incorporating an active drag-reduction system.

FIG. 2 is a schematic representation of airflow around the rear of the automobile 10 of FIG. 1 incorporating an active drag-reduction system that comprises an upper row of fluid outlets 22 located immediately below the location of the spoiler 16 (which may be removed), a lower row of fluid outlets 24 located immediately below the bumper/fender 26 and an intermediate row of fluid outlets 28 located on the rear of the vehicle approximately mid-way between the upper 22 and lower 24 rows of fluid outlets.

Air ejected from the upper row of fluid outlets 22 draws (e.g. via Bernoulli's principle and/or the Coanda effect) air flow indicated by the upper stream-lines 12 down such that flow separation is limited. Similarly, air ejected from the lower row of fluid outlets 24 draws air flow indicated by the lower stream-lines 14 upwards, delaying flow separation.

The air ejected from the upper row 22 is relatively low pressure/velocity compared to the air ejected from the lower row 24, as the purpose of the upper row 22 is merely to encourage the Coanda effect around the spoiler. However, the purpose of the lower row 24 is also to fill the lowest pressure part of the low-pressure/turbulent region 20, thereby artificially raising the pressure and/or overcoming the turbulent flow with artificially introduced laminar flow. Thus the air ejected from the lower row 24 is relatively high pressure/velocity compared to the air ejected from the upper row 22.

Air ejected from the intermediate row 28 is provided to smooth the region between the upper row 22 and the lower row 24, and is therefore at a pressure/speed between that of the upper and lower ejected air flows. In smaller cars such as coupes, the intermediate row 28 could be dispensed with. In larger vehicles such as lorries, there may be more than one intermediate row 28 to allow a more gradual variation in injected air flow speed/pressure.

Figure 3:
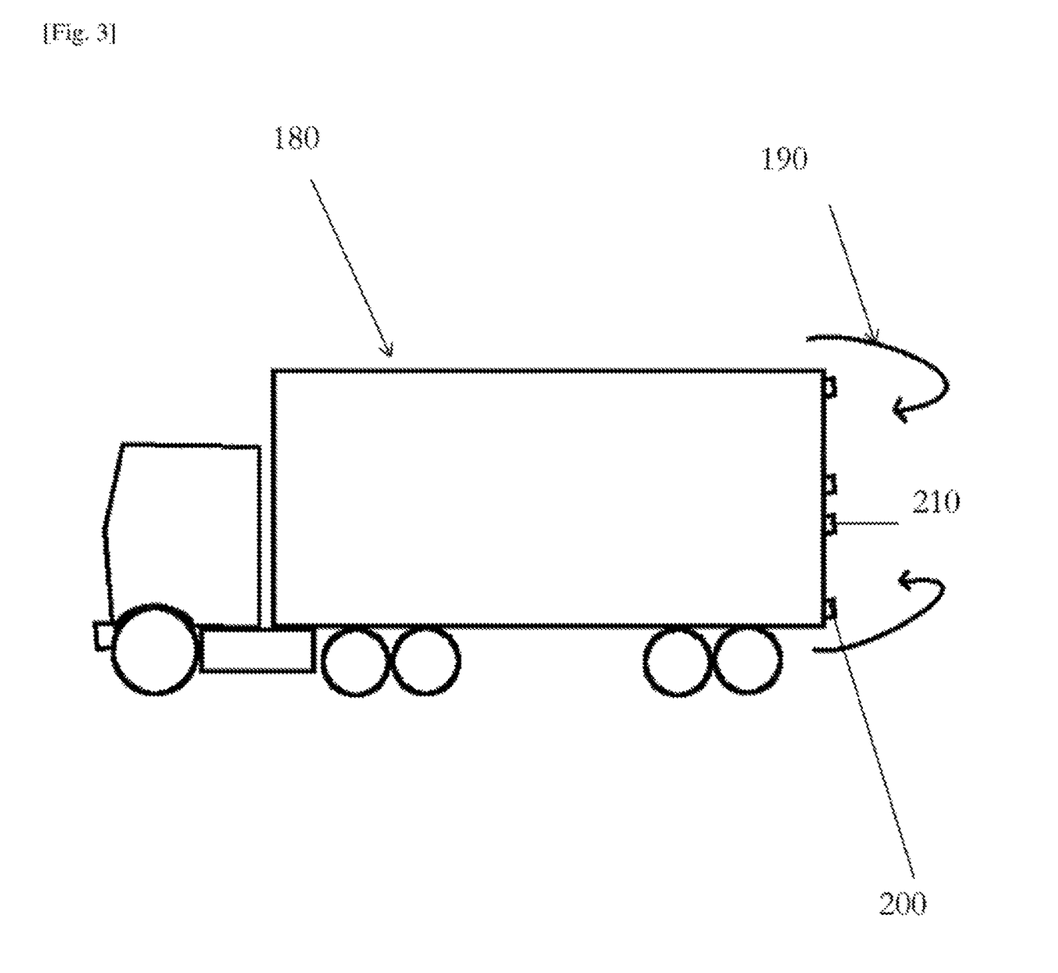
FIG. 3 is a schematic representation of an articulated lorry incorporating an embodiment of the present invention.

FIG. 3 is a schematic representation of an articulated lorry 180 incorporating an embodiment of the present invention. The lorry 180, when travelling forwards, suffers from drag, in particular form drag due to the substantially un-streamlined shape of the vehicle. Vortices 190 are formed in a low-pressure region behind the lorry 180, which contribute substantially to the form drag. The form drag could be reduces by streamlining the rear of the lorry 180; however, such an approach is undesirable because of the desire for the vehicle to allow easy access to its contents. Upper outlets 200 are provided on a periphery of the rear of the vehicle, and are specifically directed at the boundary of the vortex behind the vehicle. Intermediate outlets 210 are provided on the rear of the vehicle spaced from the periphery, and are specifically directed into the low-pressure region behind the vehicle, in order to minimise drag by reducing vortices and thereby reducing resistance. Lower outlets 200 are also provided.

In some arrangements, the outlets may be located between the cabin of the articulated lorry 180 and the container body, or adjacent to any low pressure region and/or vortex produced by a similar moving vehicle, such as behind wheels. In further arrangements, the outlets may be located on a spoiler, or adjacent to a spoiler. In particular, the outlets on/adjacent to a spoiler may be convergent nozzles and/or a nozzles supplying relatively high temperature air. An actuator and force amplifier assembly may be incorporated (e.g. adjacent to the spoiler), which may receive compressed air at a first pressure and convert it to a different pressure in accordance with Pascal's law.

Figure 4:
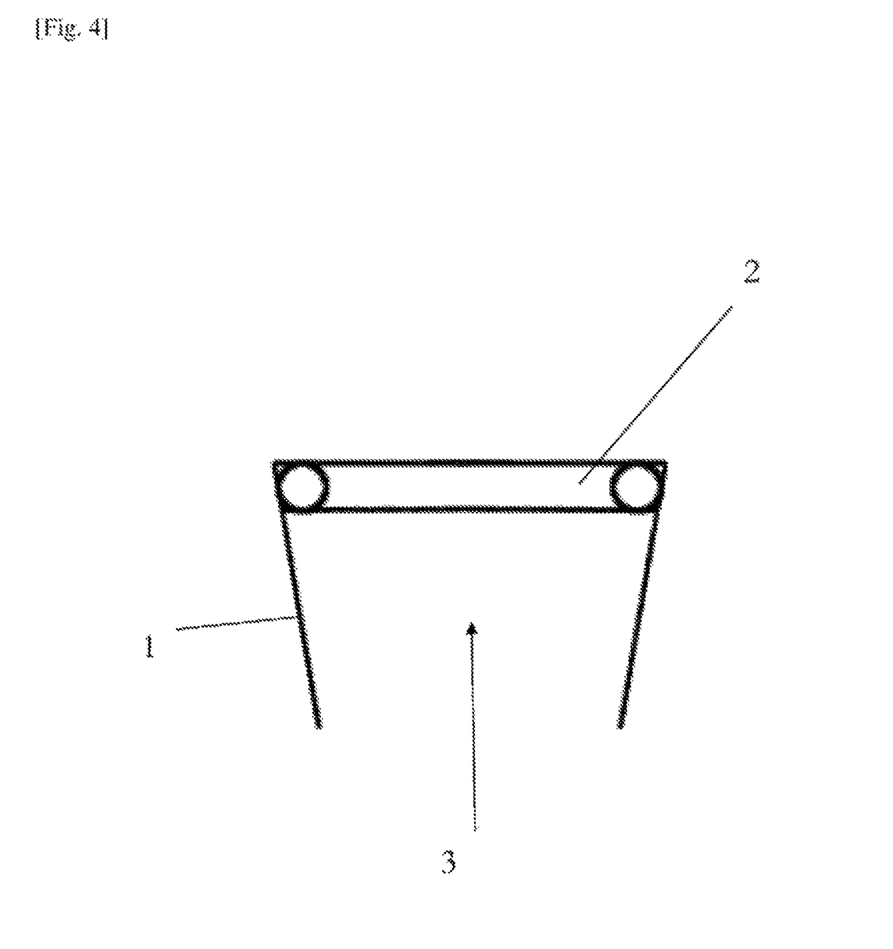
FIG. 4 is a longitudinal cross section through an outlet of a tip ring nozzle.

FIG. 4 is a longitudinal cross section through an outlet of a tip ring nozzle 1, having an annular band 2 located around the interior of the outlet of the nozzle, the annular band 2 having an approximately circular cross section, and being curved around on itself to form a substantially toroidal shape. The arrow 3 indicated direction of flow of gas through the divergent part of the nozzle. Preceding parts of the nozzle (for instance, a convergent section) are not shown for clarity.

Figure 5:
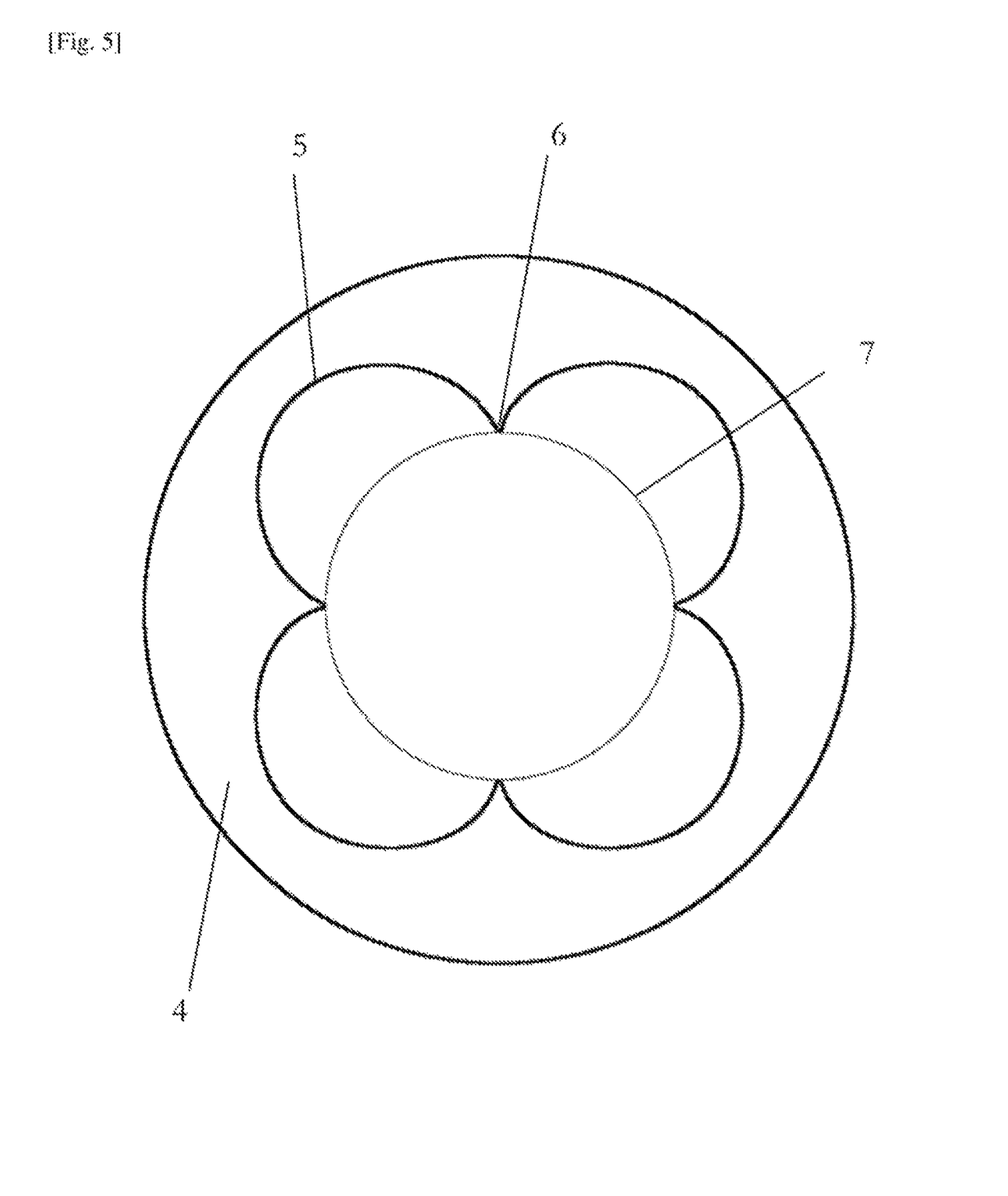
FIG. 5 is an end on (axial) view of an outlet of an elliptic sharp tipped shallow lobed nozzle.

FIG. 5 is an end on (axial) view of an outlet of an elliptic sharp tipped shallow lobed nozzle 4. The nozzle 4 has an interior profile 5 in the form of four equally spaced lobes, each separated by a sharp wall 6. The inlet 7 of the nozzle 4 is shown as an opening of reduced diameter, which may form the throat of the nozzle. The inlet 7 may comprise the connection between a converging portion of the nozzle (not shown) and the diverging portion of the nozzle 4. Therefore, the skilled person will appreciate that the degree by which the cross section of the nozzle differs from circular increases from the inlet 7 to the outlet interior profile 5.

The invention claimed is:

1. An active drag-reduction system for a vehicle in which at least one turbulent and/or low pressure region is formed adjacent to the vehicle when moving at a speed above a predetermined threshold speed, the active drag-reduction system configured to reduce the at least one turbulent and/or low pressure region when activated, the active drag-reduction system comprising:
   at least one first fluid outlet located on the vehicle adjacent to the at least one region;
   at least one second fluid outlet located on the vehicle adjacent to the at least one region and spaced from the at least one first fluid outlet, the second fluid outlet arranged to eject fluid substantially toward an interior of the at least one region; and
   a fluid supply system configured to:
      provide fluid at a first pressure and/or first ejection velocity to the at least one first fluid outlet; and
      provide fluid at a second pressure and/or second ejection velocity to the at least one second fluid outlet, wherein the second pressure and/or second ejection velocity is greater than the first pressure and/or first ejection velocity, respectively.

2. An active drag-reduction system according to claim 1, wherein the at least one first and second fluid outlets are configured to encourage laminar flow adjacent to a surface of the vehicle on which they are located.

3. An active drag-reduction system according to claim 1, wherein the at least one first fluid outlet is located on the vehicle adjacent to a perimeter of the at least one region.

4. A method of reducing vehicular drag, the method comprising the steps of:
   providing a vehicle in which at least one turbulent and/or low pressure region is formed adjacent to the vehicle when moving at a speed above a predetermined threshold speed;
   providing an active drag-reduction system according to any preceding claim; and
   expelling fluid from the at least one first and second fluid outlets into the at least one region.

* * * * *